United States Patent [19]
Burgbacher

[11] 3,814,960

[45] June 4, 1974

[54] EXTERNAL ROTOR-TYPE ELECTRIC MOTOR

[75] Inventor: Martin Burgbacher, St. Georgen, Germany

[73] Assignee: Papst-Motoren KG, St. Georgen, Germany

[22] Filed: Jan. 31, 1973

[21] Appl. No.: 328,489

Related U.S. Application Data

[63] Continuation of Ser. No. 294,899, Oct. 4, 1972, abandoned.

[30] Foreign Application Priority Data

Apr. 7, 1972  Germany ................. 7213003 [U]

[52] U.S. Cl. ............................ 310/67, 310/62
[51] Int. Cl. ................................ H02k 7/00
[58] Field of Search ........... 310/67, 58, 52, 54, 62, 310/63, 64, 65

[56] References Cited
UNITED STATES PATENTS

| | | | |
|---|---|---|---|
| 3,032,666 | 5/1962 | Papst | 310/62 |
| 3,050,647 | 8/1962 | Winther | 310/54 |
| 3,148,294 | 9/1964 | Jaeschke | 310/54 |
| 3,150,276 | 9/1964 | Moyer | 310/54 |
| 3,458,740 | 6/1969 | Kaneko | 310/67 |
| 3,555,382 | 1/1971 | Miyasaka | 310/67 |
| 3,505,547 | 4/1970 | Kaneko | 310/67 |

FOREIGN PATENTS OR APPLICATIONS

969,793  7/1958  Germany ................. 310/67

*Primary Examiner*—R. Skudy

[57] ABSTRACT

In an external rotor-type electric motor having a flange for mounting against a wall, wherein the flow of cooling air to the stator winding would ordinarily be obstructed by the wall and flange, centrifugal impeller air ducts on the rotor end draw in cooling air to one end of the stator winding through ducts extending inwardly through the flange.

8 Claims, 1 Drawing Figure

PATENTED JUN 4 1974　　　3,814,960
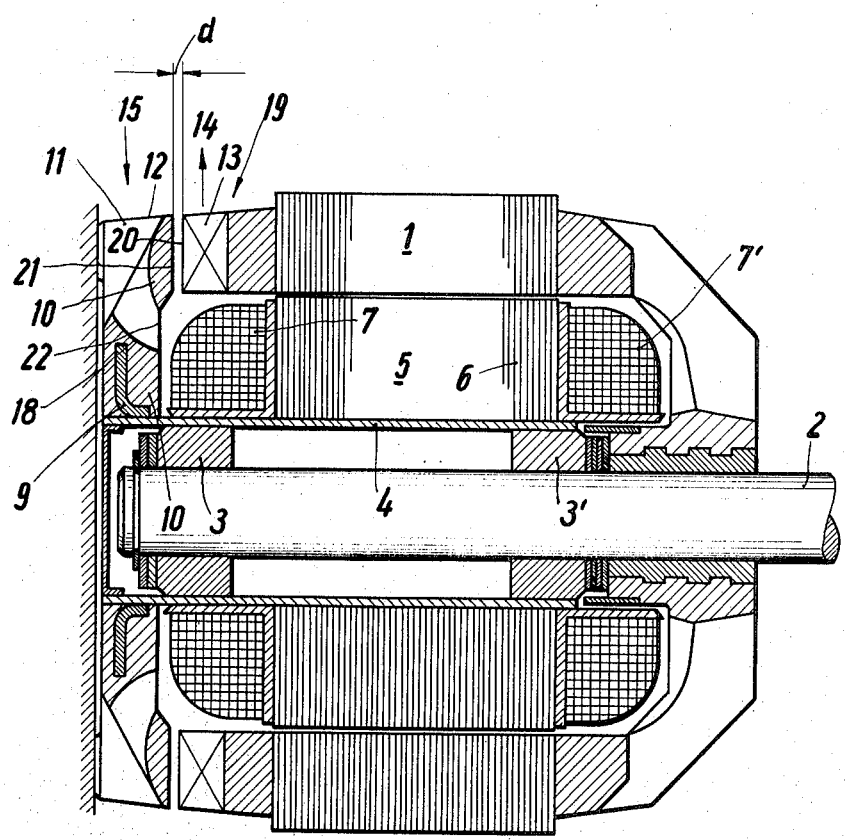

EXTERNAL ROTOR-TYPE ELECTRIC MOTOR

RELATED APPLICATION

This application is a continuation of copending Application Ser. No. 294,899, entitled EXTERNALROTOR-TYPE MOTOR, filed Oct. 4, 1972 now abandoned.

FIELD OF INVENTION

Electrical Generator Or Motor Structure, Dynamo-Electric, Cooling or fluid contact, Circulation, Suction pump or fan.

BRIEF SUMMARY OF THE INVENTION

The invention relates to an external rotor-type motor in which the stator with the stator winding is placed inside the rotor.

Numerous embodiments of such external rotor-type motors are already known. Frequently such motors are fastened at one end to a wall which, in this fastening area, is impermeable to air. In conventional motors of such structure, the flow of cooling air to the stator winding is impaired by the wall, and the motor temperature rises to undesirably high levels during the operation.

The present invention aims at an embodiment of external rotor-type motors of this kind wherein by simple constructional features and without appreciable additional expenditure, and therefore without any substantial increase in the production costs, a substantial improvement in the cooling is achieved. For this purpose, the bearing pipe supporting the rotor shaft of an external rotor-type motor is fastened to a flange serving to mount the motor on a wall, and the flange contains ventilating channels extending inwardly from the outer periphery of the flange, first in essentially radial direction and then curvedly in the axial direction of the rotor axis toward the winding turns at the adjacent end of the stator. The rotor is generally bell-shape, with the small end of the bell mounted on the rotor shaft at a point remote from the flange, and with the bell encompassing the stator so that the free end of the bell is disposed adjacent the mounting flange.

In order to enhance the flow of cooling air through the channels in the mounting flange, the free edge of the rotor should extend close to the face of the fastening flange, with only a narrow gap between them, and the free edge portion of the rotor should be provided, in this area, with radially extending air ducts. These air ducts of the rotor act as centrifugal impeller channels and produce at their inner ends, in the area adjacent to the mounting flange, a vacuum, whereby the amount of cooling air supplied through the ventilating channels is increased. An advantage results in this case from having the inner extremities of the ventilating channels in the mounting flange opposite to the turns at that end of the stator winding which faces the mounting flange, since in such arrangement the cooling air flow supplied through the air ducts impinges directly onto the winding turns of the stator winding, these being the elements which most need to be subjected to additional cooling. It will be understood that the other end of the stator winding can be ventilated with cooling air via conventional means.

The result of this improvement is that cooling air is conveyed through the ventilating channels provided in the fastening flange to the inside of the motor, i.e., to the turns at one end of the stator winding.

To improve the heat transfer from the elements to be cooled to the cooling air, it is advantageous to increase the velocity of the cooling air entering the inside of the motor; and, for this purpose, it is intended to shape the ventilating channels in the mounting flange in such a way that the cross-sections thereof decrease continuously starting from their outer extremities in the outer periphery of the fastening flange and continuing to their inner extremities at the inside of the motor.

In a preferred embodiment, the flange serving for fastening the motor consists of light metal, preferably of light metal casting.

The manufacture of such external rotor-type motors is simplified and the cost is reduced if the bearing pipe has on its outside, close to its inner end, an auxiliary flange embedded in the light-metal flange which serves to mount the motor.

DESCRIPTION OF THE DRAWING

In the following the innovation is explained with reference to the single simplified FIGURE, i.e., a longitudinal cross-section representing the preferred embodiment, in which figure all details not absolutely necessary for the understanding of the innovation are omitted for the sake of greater clarity.

SPECIFICATION

Referring now to the drawing, there is shown an external rotor-type motor which consists essentially of a bell-shape rotor 1, a rotor shaft 2, the two rotor bearings 3 and 3', a bearing pipe 4 supporting these bearings, and a stator 5 mounted on the bearing pipe. The stator includes stator plates 6, and a stator winding with end turns 7 and 7'. An auxiliary flange 9 is fastened, by means of pulse welding or hard-soldering, to the outside of a bearing pipe 4. This auxiliary flange is cast into a light-metal mounting flange 10 which contains a number of ventilating channels 11.

The ventilating channels extend inwardly from their outer extremities 12 in the outer periphery of the fastening flange, first in a radial direction and then, via curves 18, in an axial direction toward the stator 5. Rotor 1 is provided, in its free edge portion, with air ducts 13 which act, when the rotor is in operation, as centrifugal impeller channels and suck off air from the inside of the motor in the direction of an arrow 14. Thus on the inside of the rotor a vacuum is produced in the area of winding end turns 7. Since the cross sections of ventilating channels 11 decrease continuously in the direction from the outside toward the inside 22, the cooling air entering in the direction of arrow 15 is accelerated when passing through the ventilating channels and impinges directly and forceably on winding end turns 7 so that the latter are efficiently cooled. Since the mid portion of mounting flange 10 has no ventilating channels, it is excellently suited to hold the auxiliary flange 9 which serves to rigidly fasten the bearing pipe 4 which, in turn, supports the rotor.

By the above-described embodiment of an external rotor-type motor, not only the problem of improving the cooling is solved, but by the special arrangement of the cast-in auxiliary flange the manufacturing costs are also lowered.

I claim:

1. An external rotor-type electric motor, comprising:

a mounting flange adapted to be secured against a wall,
bearing means connected to said mounting flange and extending outwardly therefrom,
a stator surrounding said bearing means and affixed thereto,
said stator having a winding thereon with turns at one end thereof disposed towards said mounting flange,
a shaft rotatably supported in said bearing means,
a generally bell-shape rotor having one end affixed to said shaft remotely from said mounting flange, said rotor encompassing said stator and having the other relatively large free end disposed towards and sapced from said mounting flange,
said rotor having centrifugal impeller ducts disposed around the free end thereof radially outward of said coil turns,
and air duct means within the mounting flange providing air flow from the exterior of said flange to said turns of said stator winding,
said mounting flange having an outer peripheral portion,
said air duct means having outer end portions extending radially inward through the outer peripheral portion and inner end portions curving in the axial direction of the shaft towards said stator winding end turns.

2. An external rotor-type electric motor as claimed in claim 1, said air duct means decreasing in cross-section from the outer extremities thereof to inner extremities of the inner end portions thereof.

3. An external rotor-type electric motor as recited in claim 1, the decrease in cross-section of said air duct means being continuous.

4. An external rotor-type electric motor as claimed in claim 1, the inner extremities of the inner end portion of said air duct means terminating generally axially opposite said coil turns.

5. An external rotor-type electric motor as claimed in claim 1, characterized in that the mounting flange consists of light metal, preferably light metal casting.

6. An external rotor-type electric motor as claimed in claim 5, characterized in that the tube has, on the end thereof which is connected to the mounting flange, an auxiliary flange embedded in the mounting flange casting.

7. An external rotor-type electric motor as claimed in claim 1, characterized in that the mounting flange is airtight other than for said air passage means.

8. An external rotor-type electric motor as claimed in claim 1, characterized in that the free end thereof is closely spaced from the mounting flange.

* * * * *